United States Patent Office 3,452,052
Patented June 24, 1969

3,452,052
CERTAIN 1-(2¹-BENZOFURANYL)-1-HYDROXY-2-
ALKYLAMINO OR ARALKYLAMINO ETHANES
Fernand Binon and Charles Goldenberg, Brussels,
Belgium, assignors to Societe Belge de l'Azote et
des Produits Chimiques du Marly, Societe Anonyme,
Liege, Belgium
No Drawing. Filed May 19, 1965, Ser. No. 457,156
Claims priority, application Great Britain, May 20, 1964,
20,922/64
Int. Cl. C07d 5/40; A61k 27/00
U.S. Cl. 260—346.2     8 Claims This invention relates to new benzofuran derivatives, and therapeutic uses thereof.

Such benzofuran derivatives are represented by the formula:

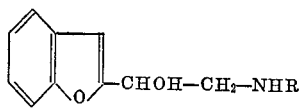

wherein R is selected from the group consisting of ethyl, isopropyl, allyl, n-butyl, tertbutyl, cyclohexyl, phenethyl, 3:4-methylenedioxy-phenethyl, 3 - phenylpropyl, phenylisopropyl, 1-methyl-3-phenyl-propyl, 3-p-methoxyphenyl-1-methyl-propyl and phenoxyethyl.

The pharmaceutically acceptable acid addition salts of the compounds of Formula I are included within the scope of the present invention.

Preferred compounds of the invention are 1-(2'-benzofuryl) - 1 - hydroxy - 2 - N - (3' - phenylpropylamino)-ethane; 1 - (2'-benzofuryl)-1-hydroxy-2-N-phenoxyethylamino-ethane and 1-(2'-benzofuryl)-1-hydroxy-2-N-isopropylamino-ethane, and pharmaceutically acceptable acid addition salts thereof.

The compounds of Formula I may be prepared by reacting a halogenated benzofuran compound of the formula:

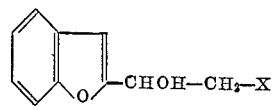

wherein X is chlorine or bromine, with an amine of the formula RNH₂, in which R has the same meaning as in Formula I.

The reaction is preferably carried out by heating the two reactants in an appropriate solvent, for example methanol, ethanol or benzene, for a period of, for example, from 4 to 24 hours, at a temperature of, for example, from 60 to 120° C. either under atmospheric pressure or under superatmospheric pressure in a closed vessel. The final amine product may be isolated in the form of a free base, in which case it can be recrystallized from a solvent such as, for example, cyclohexane or petroleum ether, or in the form of an acid addition salt, for example the hydrochloride or oxalate, in which case it can be recrystallized from a solvent or mixture of solvents such as, for example, methyl ethyl ketone, ethanol, acetone or tetrahydrofuran.

The starting materials represented by Formula II may be prepared by the reduction of a compound of the formula:

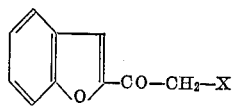

wherein X is chlorine or bromine. The reduction may be carried out with a reducing agent such as sodium borohydride in a lower alcohol such as methanol or ethanol at a temperature of, for example, from 0 to 20° C.

The compounds of Formula III are known compounds.

The benzofuran compounds of the invention, i.e. the compounds of Formula I have been found to possess pharmacological and therapeutic activity. In particular, compounds included within the definition of Formula I have been found unexpectedly to counteract in the animal body the stimulation of cardiac contraction and/or the tachycardia which is produced by sympathomimetic amino-ethanols, such as adrenaline, noradrenaline and N-isopropyl noradrenaline. One such compound which has been found to exhibit counteracting effects on the stimulation of cardiac contraction and on the tachycardia produced by sympathomimetic aminoethanols is 1-(2'-benzofuryl)-1-hydroxy-2-N-isoproylamino-ethane (in the form of its hydrochloride).

Table I which follows illustrates the degree of this particular type of pharmacological activity observed in the case of certain compounds of the invention, such degree of pharmacological activity being given in terms of a number of + (plus) marks.

TABLE I

| R | Suppression of stimulation of cardiac contraction produced by noradrenaline | Suppression of tachycardia provoked by isoprenaline |
|---|---|---|
| Isopropyl | ++++ | ++++ |
| Ethyl | + | |
| Cyclohexyl | 0 | + |
| 3=4-methylene-dioxy-phenethyl | 0 | ++ |
| Phenyl-isopropyl | + | ++ |
| 1-methyl-3-phenyl-propyl | + | ++++ |

The particular pharmacological activity illustrated above, when translated onto the clinical plane, constitutes an effective therapeutic and prophylatic treatment of certain cardiac diseases. For example, it has ben found that cardiovascular disorders and, in particular, affections of the coronary vessels characterized by angina or resulting from myocardial infarction may be arrested and their recurrence prevented by treatment with the compounds contemplated by the present invention. A similar response has also been observed in clinical practice in cases of obstructive cardiomyopathy and disorders of cardiac rhythm of various origins. In addition, certain of the compounds of Formula I have been found to possess peripheral vasodilatory activity which renders them useful in the treatment of chronic hypertensive conditions and of dysfunction of the peripheral vascular system. Examples of such peripheral vasodilatory compounds are 1-(2'-benzofuryl)-1-hydroxy-2-N-phenethyl-amino-ethane (as the hydrochloride), 1 - (2'-benzofuryl)-1-hydroxy-2-N-(1'-methyl-3'-phenyl-propylamino)-ethane (as the hydrochloride) and, in particular, 1-(2'-benzofuryl)-1-hydroxy-2-N-(3'-phenylpropylamino)-ethane (as the hydrochloride) and 1-

(2'-benzofuryl)-1-hydroxy-2-N-phenoxyethyl-amino-ethane (as the hydrochloride), which possess a particularly prolonged peripheral vasodilatory action.

Table II which follows illustrates the degree of the above-mentioned hypotensive activity obtained with certain compounds of the invention by intravenous injection in dogs. As with Table I the degree of activity is given in terms of the number of + (plus) marks.

TABLE II

| R | Intensity | Duration |
|---|---|---|
| Phenethyl | + | + |
| 1-methyl-3-phenyl-propyl | ++ | ++ |
| 3-phenyl-propyl | +++ | +++ |
| Phenoxyethyl | +++ | ++++ |

It will be appreciated that for therapeutic use the compounds of Formula I will normally be administered in the form of a pharmaceutical composition comprising as an essential active ingredient, a compound of Formula I, or a pharmaceutically acceptable acid addition salt thereof, and in association therewith a pharmaceutical carrier therefor. The carrier may be a solid or liquid diluent or excipient of the kind normally employed in the production of medicaments ready for use, for example lactose, potato starch, talc, magnesium stearate, gelatin, sodium chloride or distilled water.

The composition may be made up in a form suitable for the desired mode of administration, which may be by the oral or parenteral route. Advantageously for clinical use the composition is made up in a dosage unit form adapted for the desired mode of administration. The dosage unit may be, for example, a tablet, pill, packaged powder or capsule for oral administration, or a sterile solution packaged in a sealed container such as an ampoule for parenteral administration. The amount of active ingredient in each dosage unit will be such that one or more units is required for each therapeutic administration. For example, the dosage unit may contain from 5 to 250 mg. of the active ingredient.

In the following specific examples, Examples 1 and 2 illustrate the preparation of the intermediates represented by Formula II and Example 3 illustrates the preparation of a compound of the invention.

EXAMPLE 1

30 g. of 2-ω-bromo-acetyl-benzofuran were suspended in 750 ml. of methanol and cooled to 0° C. in an ice bath. 9.1 g. of sodium borohydride were gradually added so that the temperature was maintained between 10 and 20° C. The mixture was stirred for one hour at room temperature and then evaporated to dryness. The resulting solid residue was decomposed in cold water, taken up in ether, washed with water, dried over anhydrous sodium sulphate and the ether evaporated to yield a residue which was 1-(2'-benzofuryl)-1-hydroxy-2-bromo-ethane (76% yield).

The residual product was sufficiently pure as such to be employed as a starting material, as shown by the absence of absorption frequency C=O at about 1680 cm.⁻¹ in the I.R. spectrum and the presence of a considerable band in the region of 3400 cm.⁻¹, showing the existence of the —OH group.

EXAMPLE 2

Using the method described in Example 1, 2-ω-chloro-acetyl-benzofuran was converted into 1-(2'-benzofuryl)-1-hydroxy-2-chloro-ethane (86%).

EXAMPLE 3

16 g. of 1-(2'-benzofuryl)-1-hydroxy-2-chloro-ethane, prepared as described in Example 2, and 17.5 g. of iso-propylamine dissolved in 84 ml. of absolute ethanol were refluxed for 24 hours. The ethanol was evaporated under vacuum and the residue taken up in ether, washed with a 10% solution of caustic soda and then with water. The organic phase was dried over sodium sulphate and then the solvent was evaporated to form a residue. The resulting solid residue, when recrystallized from cyclohexane, formed white crystals of 1-(2'-benzofuryl)-1-hydroxy-2-N-isopropylamino-ethane (9.2 g.) having a M.P. of 108–109° C. Yield 61%.

The hydrochloride was prepared with gaseous hydrogen chloride giving a yield of 80%. The hydrochloride had a M.P. of 155° C. when recrystallized from methyl ethyl ketone/ethanol.

Following the method described above, the compounds listed hereunder have been prepared:

| Compound | Melting point, ° C. | Yield, percent |
|---|---|---|
| 1-(2'-benzofuryl)-1-hydroxy-2-N-ethylamino-ethane. | 108 (cyclohexane) | 43.3 |
| 1-(2'-benzofuryl)-1-hydroxy-2-N-phenethylamino-ethane. | 99–100 (cyclohexane) | 30.1 |
| 1-(2'-benzofuryl)-1-hydroxy-2-N-allylamino-ethane. | 92 (petroleum ether 30/40) | 25.7 |
| 1-(2'-benzofuryl)-1-hydroxy-2-N-cyclohexylamino-ethane. | 106 (cyclohexane) | 17.2 |
| 1-(2'-benzofuryl)-1-hydroxy-2-N[p-(3'=4'-methylenedioxyphenyl)-ethylamino]-ethane hydrochloride. | 184 (methyl ethyl ketone/ethanol). | |
| 1-(2'-benzofuryl)-1-hydroxy-2-N-(A-methyl-phenethylamino)-ethane hydrochloride. | 145 (methyl ethyl ketone). | 23 |
| 1-(2'-benzofuryl)-1-hydroxy-2-N-(1'-methyl-3'-phenyl-propylamino)-ethane hydrochloride. | 171 (tetrahydrofuran) | |
| 1-(2'-benzofuryl)-1-hydroxy-2-N-(3'-phenylpropylamino)-ethane. | 110 (cyclohexane). | 24 |
| 1-(2'-benzofuryl)-1-hydroxy-2-N-(n-butylamino)-ethane hydrochloride. | 172–173 (ethanol/methyl ethyl ketone). | 42 |
| 1-(2'-benzofuryl)-1-hydroxy-2-N-tertbutylamino-ethane. | 133 (cyclohexane) | 21.4 |
| 1-(2'-benzofuryl)-1-hydroxy-2-N-phenoxyethylamino-ethane hydrochloride. | 202 (ethanol) | 37.9 |

EXAMPLE 4

Tablets were prepared by granulating and compressing the following ingredients in accordance with known pharmaceutical techniques:

| Ingredient: | Mg. per tablet |
|---|---|
| 1-(2'-benzofuryl)-1-hydroxy-2-N-isopropylamino-ethane hydrochloride | 25 |
| Lactose | 161 |
| Gelatin | 4 |
| Potato starch | 50 |
| Talc | 7.5 |
| Magnesium stearate | 2.5 |
| | 250.0 |

EXAMPLE 5

An injection solution was placed in a 5 ml. ampoule after being made up from the following ingredients in accordance with known pharmaceutical techniques:

| | Mg. |
|---|---|
| 1-(2'-benzofuryl)-1-hydroxy-2-N-isopropylamino-ethane hydrochloride | 25 |
| Sodium chloride | 40 |
| Distilled water q.s. to make 5 ml. | |

EXAMPLE 6

Tablets were prepared by granulating and compressing the following ingredients in accordance with known pharmaceutical techniques:

| Ingredient: | Mg. per tablet |
|---|---|
| 1-(2'-benzofuryl)-1-hydroxy-2-N-phenoxyethyl-amino-ethane hydrochloride | 50 |
| Lactose | 100 |
| Corn starch | 38 |
| Gelatin | 5 |
| Talc | 5 |
| Magnesium stearate | 2 |
| | 200 |

EXAMPLE 7

An injection solution was placed in a 5 ml. ampoule after being made up from the following ingredients in accordance with known pharmaceutical techniques:

| | Mg. |
|---|---|
| 1-(2'-benzofuryl)-1-hydroxy - 2 - N - phenoxyethyl-amino-ethane hydrochloride | 20 |
| Propylene glycol | 100 |
| Distilled water q.s. to make 5 ml. | |

What is claimed is:

1. A compound of the class consisting of a free base and the pharmaceutically acceptable acid addition salts thereof, said free base being represented by the formula:

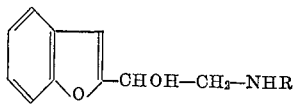—CHOH—CH$_2$—NHR wherein R is selected from the group consisting of ethyl, isopropyl, allyl, n-butyl, tertbutyl, cyclohexyl, phenethyl, 3:4 methylenedioxy-phenethyl, 3-phenyl-propyl, phenyl-isopropyl, 1-methyl-3-phenyl-propyl, 3-p-methoxy-phenyl-1-methyl-propyl and phenoxyethyl.

2. A compound as claimed in claim 1, wherein R is allyl, cyclohexyl, 3:4-methylenedioxy-phenethyl, 3-phenyl-propyl, 1-methyl-3-phenylpropyl, 3-p-methoxyphenyl-1-methylpropyl or phenoxyethyl.

3. 1-(2'-benzofuryl)-1-hydroxy-2-N - isopropylamino-ethane.

4. A pharmaceutically acceptable acid addition salt of 1-(2'-benzofuryl)-1-hydroxy - 2 - N - isopropylamino-ethane.

5. 1-(2'-benzofuryl)-1-hydroxy-2-N-(3' - phenylpropyl-amino)-ethane.

6. A pharmaceutically acceptable acid addition salt of 1-(2'-benzofuryl)-1-hydroxy - 2 - N - (3' - phenylpropyl-amino)-ethane.

7. 1-(2'-benzofuryl)-1-hydroxy - 2 - N - phenoxyethyl-amino-ethane.

8. A pharmaceutically acceptable acid addition salt of 1-(2'-benzofuryl)-1-hydroxy - 2 - N - phenoxyethylamino-ethane.

References Cited

Burger et al., J. Am. Chem. Soc., vol. 67, pp. 566–9 (1945).

Wagner and Zook, Synthetic Organic Chem., N.Y. John Wiley (1953), p. 151 and p. 669.

ALEX MAZEL, *Primary Examiner.*

BERNARD I. DENTZ, *Assistant Examiner.*

U.S. Cl. X.R.

424—285